United States Patent
Klein et al.

(10) Patent No.: US 9,411,980 B2
(45) Date of Patent: *Aug. 9, 2016

(54) PREVENTING MODIFICATIONS TO CODE OR DATA BASED ON THE STATES OF A MASTER LATCH AND ONE OR MORE HARDWARE LATCHES IN A HOSTING ARCHITECTURE

(71) Applicant: AMAZON TECHNOLOGIES, INC., Seattle, WA (US)

(72) Inventors: Matthew D. Klein, Seattle, WA (US); Samuel J. McKelvie, Seattle, WA (US); Michael David Marr, Monroe, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,733

(22) Filed: Sep. 25, 2015

(65) Prior Publication Data

US 2016/0019398 A1 Jan. 21, 2016

Related U.S. Application Data

(63) Continuation of application No. 13/536,049, filed on Jun. 28, 2012, now Pat. No. 9,158,326.

(51) Int. Cl.
| | |
|---|---|
| *G06F 1/00* | (2006.01) |
| *G06F 13/14* | (2006.01) |
| *G06F 15/177* | (2006.01) |
| *G06F 17/00* | (2006.01) |
| *G06F 21/62* | (2013.01) |
| *G06F 21/80* | (2013.01) |
| *G06F 21/85* | (2013.01) |
| *G06F 21/71* | (2013.01) |

(52) U.S. Cl.
CPC ............ *G06F 21/6218* (2013.01); *G06F 1/00* (2013.01); *G06F 21/71* (2013.01); *G06F 21/80* (2013.01); *G06F 21/85* (2013.01); *G06F 13/14* (2013.01); *G06F 15/177* (2013.01); *G06F 17/00* (2013.01)

(58) Field of Classification Search
CPC ....... G06F 21/6218; G06F 1/00; G06F 21/80; G06F 21/71; G06F 21/85; G06F 15/177; G06F 13/14; G06F 17/00
See application file for complete search history.

(56) References Cited

U.S. PATENT DOCUMENTS

| | | | |
|---|---|---|---|
| 7,069,452 B1 * | 6/2006 | Hind | G06F 21/572 713/1 |
| 9,158,326 B1 * | 10/2015 | Klein | G06F 1/00 |
| 2008/0086780 A1 | 4/2008 | Chen et al. | |
| 2009/0259784 A1 | 10/2009 | Perry et al. | |
| 2010/0138521 A1 * | 6/2010 | DeHaan | G06F 15/177 709/221 |

* cited by examiner

*Primary Examiner* — Jaweed A Abbaszadeh
*Assistant Examiner* — Terrell Johnson
(74) *Attorney, Agent, or Firm* — Knobbe, Martens, Olson & Bear, LLP

(57) ABSTRACT

A service provider can maintain one or more host computing devices that can be accessed as host computing device resources by customers. A hosting platform includes components arranged in a manner to limit modifications to software or firmware on hardware components. In some aspects, the hosting platform may include a master latch that indicates whether the components may be configured, and the master latch may be set once and only reset upon completion of a power cycle. In another aspect, the hosting platform can implement management functions for establishing control plane functions between the host computing device and the service provider that is independent of the customer. Additionally, the management functions can also be utilized to present different hardware or software attributes of the host computing device.

19 Claims, 14 Drawing Sheets

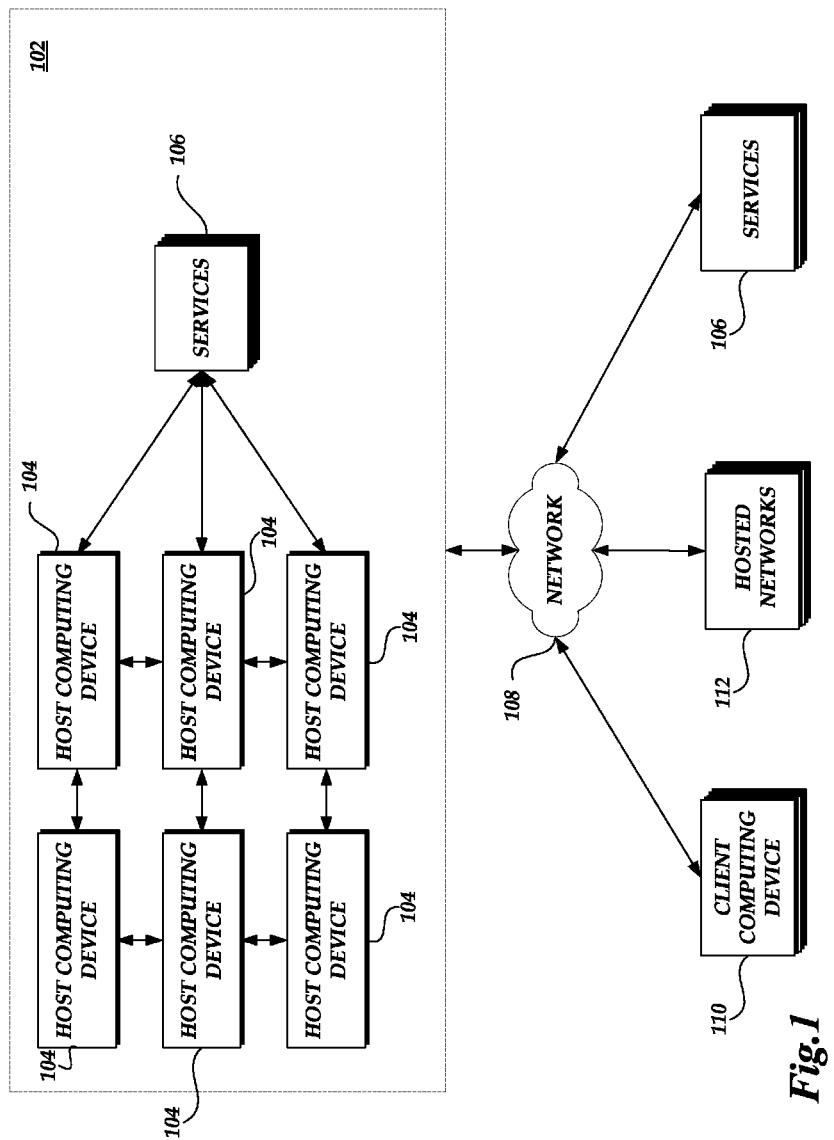

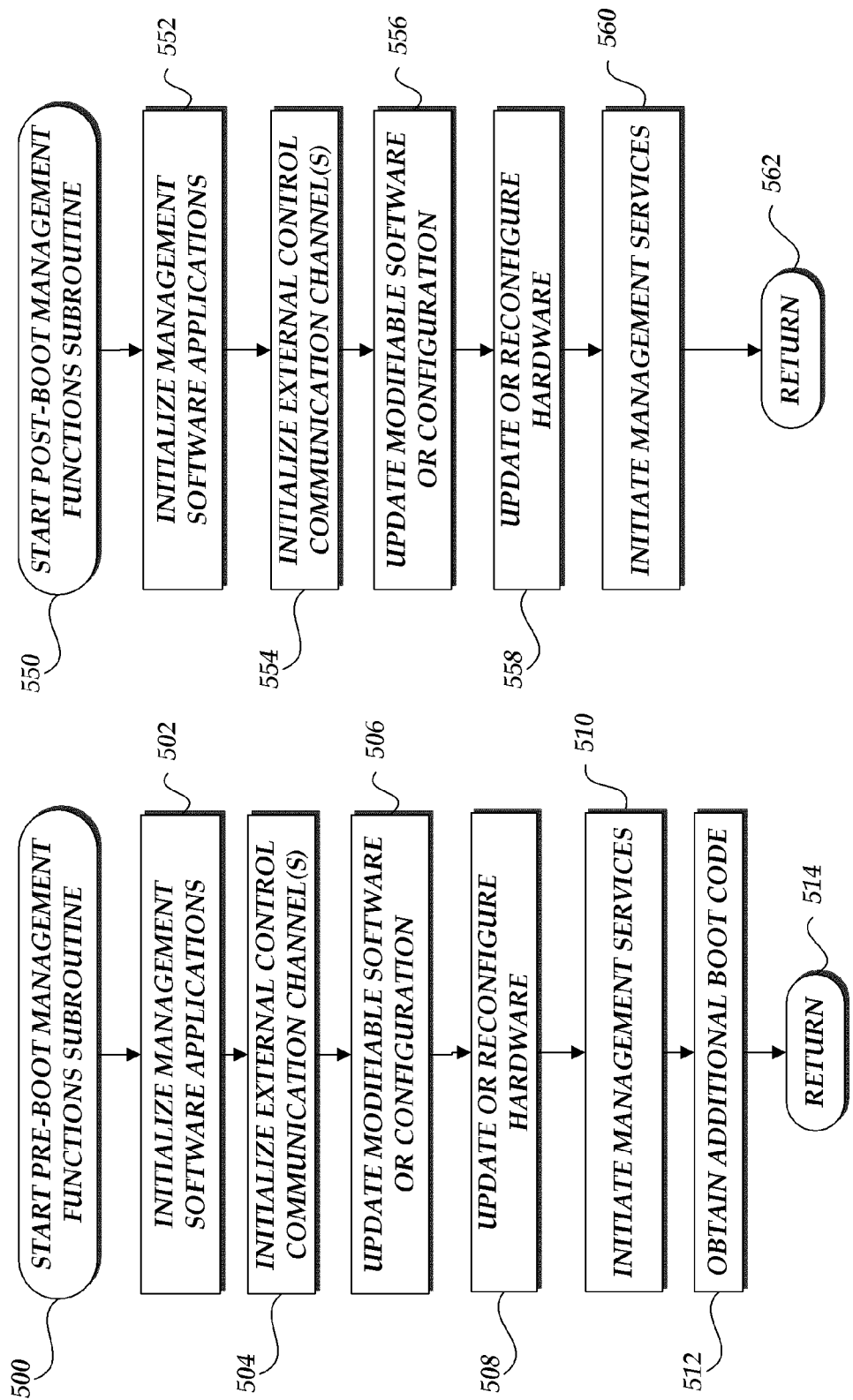

PREVENTING MODIFICATIONS TO CODE OR DATA BASED ON THE STATES OF A MASTER LATCH AND ONE OR MORE HARDWARE LATCHES IN A HOSTING ARCHITECTURE

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some cases, customers may want special hardware or full access to specific computing device resources provided in a data center. However, such access comes with risks for service providers of those resources. Specifically, in a shared environment, such as a data center, there typically will be other users sharing common computing resources at various times or subsequently using previously accessed resources. Accordingly, a modification or manipulation of a resource by one customer, whether intentional, unintentional, or malicious, can potentially be detrimental to subsequent customers.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 1 is a block diagram depicting an illustrative environment for managing host computing devices including a number of hosted computing devices, client computing devices and networks and network-based services;

FIGS. 5A and 5B are flow diagram illustrative of embodiments of a host management process sub-routine implemented by a host computing device.

DETAILED DESCRIPTION

Figure 2A:
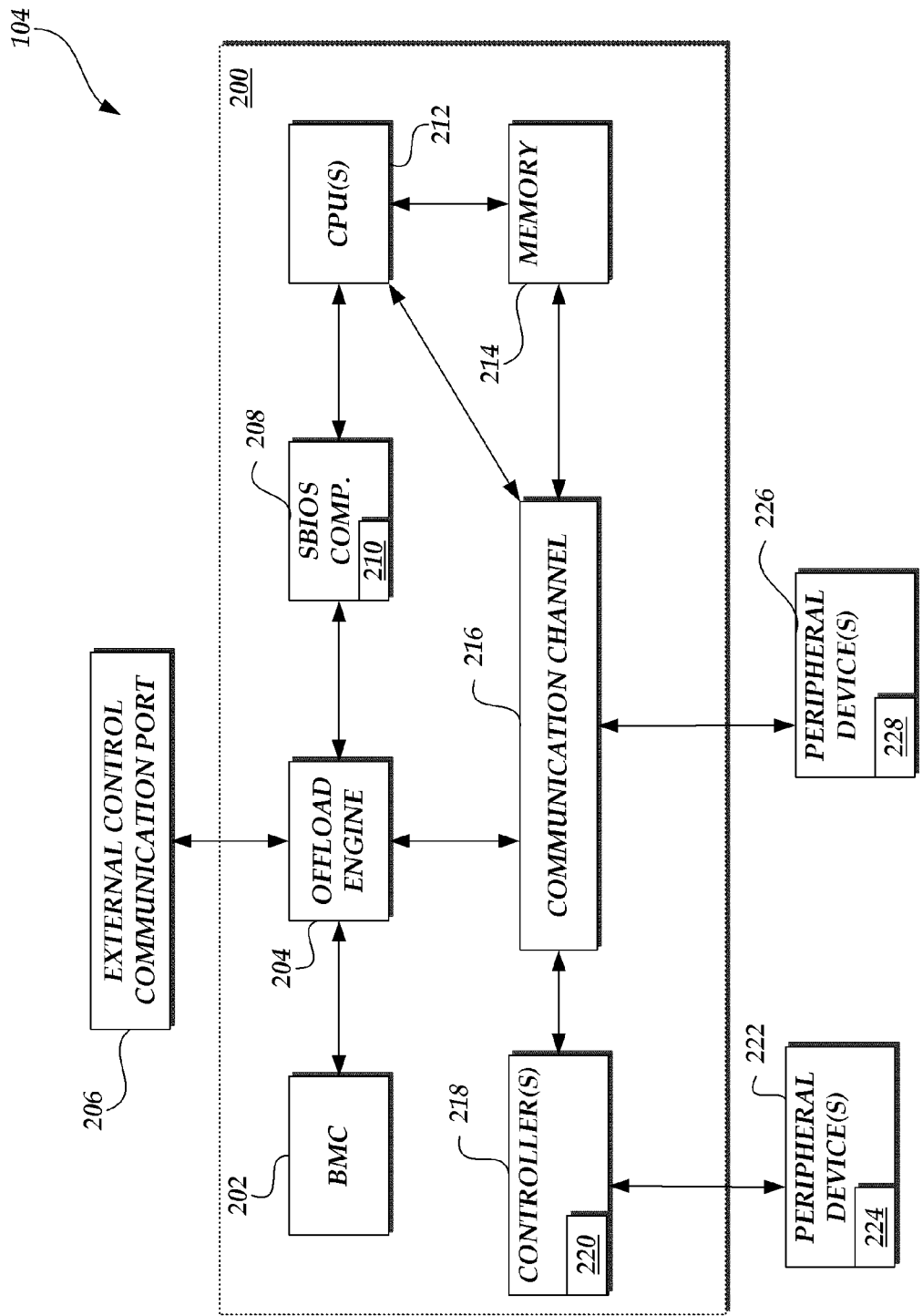
FIGS. 2A-2D are block diagrams depicting various embodiments corresponding to illustrative components and configurations of a host computing device.

Generally described, the present application relates to systems and methods for granting a user or customer with substantially full access to at least a subset of hardware resources associated, or otherwise provided by, a service provider. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect ("PCI") bus. These peripheral devices can include network interface cards (NICs), graphics processing units ("GPUs"), and similar devices that would often be virtualized in a hosted computing environment. In the some cases, a customer might have full access to an entire machine, or groups of machines, including any or all devices incorporated therein. For a group of machines such as a rack of servers, a user might be granted substantially full native access to the entire rack, including any switches or other devices or components provided as part of the rack. Such embodiments can be generally referred to, and are sometimes known in the art, as "bare metal" instances or "access to bare metal".

In accordance with an illustrative embodiment, a service provider can maintain one or more host computing devices which may be utilized as bare metal instances by one or more customers of the service provider. Illustratively, each host computing device includes hardware components that are configured in a manner to allow the service provider to implement one or more management processes upon a power cycle of the host computing device and prior to access of the host computing device resources by customers. In one aspect, the present disclosure relates to an offload engine component, baseboard management component ("BMC") and various hardware latches arranged in a manner to limit modifications to software or firmware on hardware components, such as System Basic Input/Output System ("SBIOS"), hard drives and hard driver controllers, peripherals, and the like. In another aspect, the present disclosure relates to management functions for establishing control plane functions between the host computing device and the service provider that is independent of the customer processes that will be subsequently executed on the host computing device. Additionally, the management functions can also be utilized to present different hardware or software attributes of the host computing device.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to illustrative components of host computing device, one or more aspects of the present disclosure can be applied with regard to different types or configurations of physical computing devices or combinations thereof.

FIG. 1 is a block diagram illustrating an embodiment of host computing device environment 100. The host computing device environment 100 includes a virtual network 102 that includes multiple physical computing devices, generally referred to as host computing devices 104. Illustratively, each host computing device 104 includes a number of hardware and software components, examples of which will be described, in part, with regard to FIG. 2. Additionally, in some embodiments, one or more of the host computing devices 104 are capable of hosting multiple virtual machine instances. At least some of the virtual machine instances may be provisioned to implement portions of a hosted network or to simulate one or more components of a hosted network. Illustratively, the virtual machine instances may be configured to provide specific functionality associated with the components of the hosted network or simulation of the components of the hosted network. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. Additionally, one or more virtual machine instances may be provisioned generically when a desired functionality is not specified or is otherwise not available. One skilled in the relevant art will appreciate that the virtual network 102 is logical in nature and can encompass host computing devices 104 from various geographic regions.

The virtual network 102 also includes one or more network based services 106 for managing the implementation of changes to host computing devices 104. Illustratively, the network based services 106 can functionality to one or more of the host computing devices 104, either for the benefit a service provider, customer, third party or a combination thereof. For example, the network-based services 106 can include security services related to the management of communications, encryption of content, etc. In another example, the network-based services 106 can include a provisioning service related to the establishment or configuration of operating environments, software applications, software updates, software configurations that will be executed by a customer on a host computing device 104. In a further example, the network-based services 106 can also include financial and accounting services related to the management of financial transaction information between customers and the service provider based on utilization of the host computing devices. Additional or alternative network-based services may also be contemplated. Additionally, although the network-based services 106 are described as being integrated in the virtual network, one or more network-based services may be implemented external to the virtual network 102 as also illustrated in FIG. 1.

With continued reference to FIG. 1, connected to the virtual network 102 via a network 108 are multiple client computing devices 110. The network 108 may be, for instance, a wide area network (WAN), a local area network (LAN), or a global communications network. In some instances, the client computing devices 110 may interact with the virtual network 102 to request the allocation of one or more hosted computing devices 104 on behalf of a customer. Additionally, the virtual network 102 may be integrated with other hosted client computing networks 112. As previously described, in some embodiments, one or more of the network-based services 102 may be separate from the virtual network 102.

With reference now to FIG. 2A, a block diagram depicting illustrative components associated with a host computing device 104 will be described. However, one skilled in the relevant art will appreciate that the disclosed illustrative components are not meant to be an exhaustive identification of all the components required by a host computing device 104. Rather, illustrative components have been identified, in a non-limiting manner, to facilitate illustration of one or more aspects of the present application. Still further, the illustrative components of the host computing device 104 can be considered logical in nature such that the physical implementation of one or more components can be varied or such that one or more of the logical components may be implemented in a virtualized manner. Additionally, one or more host computing devices 104 can share one or more of the illustrated components, such as processors, graphical processing units, memory and the like.

In an illustrative embodiment, each host computing device is associated various hardware components, software components and respective configurations that facilitate the implementation of host computing device boot process, which will be described in detail below. Specifically, in one embodiment, the host computing devices 104 include a bare metal hosting platform 200 for managing various functions associated with bare metal host computing devices. The bare metal hosting platform 200 can include a Baseboard Management Controller ("BMC") 202 for managing the operation of the host computing device in accordance with the Intelligent Platform Management Interface ("IPMI"). Specifically, the BMC 202 can include an embedded microcontroller that manages the interface between system management software and host computing device 104 host computing device 104 components.

In communication with the BMC 202 is an offload engine component 204. In one aspect, the offload engine component 204 can communicate as a standard bridge component for facilitating access between various physical and emulated components and a communication channel component 216. In another aspect, the offload engine component 204 can include embedded microprocessors to allow the offload engine component to execute computer-executable instructions related to the implementation of management functions or the management of one or more such management functions, or to execute other computer-executable instructions related to the implementation of the offload engine component. Illustratively, the BMC 202 is configured in such a way to be electrically isolated from any other component in the bare metal hosting platform 200 other than the offload engine component 204.

Also in communication with the offload engine component 204 is an external communication port component 206 for establishing communication channels between the bare metal hosting platform 200 and one or more network-based services or other computing devices. Illustratively, the external communication port component 206 can corresponds to a Top of Rack ("TOR") small port count switch. TOR switches are typically located on the top, or substantially near the top, of physical racks housing host computing devices 104 and provide communication connectivity to external network components in accordance with a communication protocol. As will be described in greater detail below, the offload engine component 204 can utilize the external communication port component 206 during the boot process. Additionally, the offload engine component 204 can utilize the external communication port component 206 to maintain communication channels between one or more services and the host computing devices 104, such as health check services, financial services, and the like.

The offload engine component 204 is also in communication with an SBIOS component 208. Illustratively, the SBIOS component 208 includes non-transitory executable code, often referred to as firmware, that is executed by one or more processors and is used to cause components of the host computing device 104 to initialize and identify system devices such as the video display card, keyboard and mouse, hard disk drive, optical disc drive and other hardware. The SBIOS component 208 can also include or locate boot loader software that will be utilized to boot the host computing device 104. As will be explained below, in one embodiment, the SBIOS component 208 can include executable code that, when executed by a processor, causes the host computing device to attempt to locate PXE boot software. Additionally, the SBIOS component 208 includes or takes the benefit of a hardware latch 210 that is electrically controlled by the offload engine component 204. The hardware latch 210 restricts access to one or more aspects of the SBIOS component 208, such controlling modifications or configurations of the executable code maintained in the SBIOS component 208. In some embodiments, the hardware latch 210 may be physically on a memory component that stores, either permanently or temporarily, the SBIOS software code. In other embodiments, the hardware latch 210 may be physically separate from a memory component that stores, either permanently or temporarily, the SBIOS software code, such as integrated in a bus controller, memory controller or other components which may provide a communication channel to the SBIOS component 208. In both embodiments, the hardware latch 210 controls, directly or indirectly, the ability to make modifications to the SBIOS software code.

With continued reference to FIG. 2A, the SBIOS component 208 is connected (or in communication with) a number of additional computing device resources components, such as central processing units ("CPUs") 212, memory 214 (e.g., RAM), and the like. In one embodiment, such computing device resource components may be physical computing device resources in communication with other components via the communication channel 216. Illustratively, the communication channel 216 can correspond to a communication bus, such as PCI bus in which the components of the bare metal hosting platform 200 communicate in accordance with the PCI standards. Other types of communication channels, communication media, communication buses or communication protocols (e.g., the Ethernet communication protocol) may also be utilized. Additionally, in other embodiments, one or more of the computing device resource components may be virtualized hardware components emulated by the host computing device 104. In such embodiments, the offload engine component 204 can implement a management process in which a host computing device is configured with physical or emulated hardware components based on a variety of criteria. The computing device resource components may be in communication with the offload engine component 204 via the communication bus 216.

Also in communication with the offload engine component 204 via the communication channel 216 are one or more controller components 218 for managing hard drives or other forms of peripheral devices. An example of a controller component 218 can be a SATA hard drive controller. Similar to the SBIOS component 208, the controller components 218 includes or takes the benefit of a hardware latch 220 that is electrically controlled by the offload engine component 204. The hardware latch 220 restricts access to one or more aspects of the controller component 218. Illustratively, all the hardware latches (e.g., hardware latches 210, 220, 224, 228) may be controlled together or independently. For example, the offload engine component 204 may selectively close a hardware latch for one or more components based on a trust level associated with a particular customer. In another example, the offload engine component 204 may selectively close a hardware latch for one or more components based on a trust level associated with an author or distributor of the executable code to be executed by the offload engine component. In a further example, the offload engine component 204 may selectively close a hardware latch for one or more components based on a trust level associated with the component itself.

The host computing device 104 can also include additional components that are in communication with one or more of the illustrative components associated with a bare metal hosting platform 200. As illustrated in FIG. 2A, such components can include devices, such as one or more controllers 218 in combination with one or more peripheral devices 222, such as hard disks or other storage devices. Additionally, the additional components of the bare metal hosting platform 200 can include another set of peripheral devices 226, such as Graphics Processing Units ("GPUs"). Illustratively, the peripheral devices 222 and 226 can also be associated with hardware latches 224 and 228 for restricting access to one or more aspects of the component. As mentioned above, in one embodiment, the hardware latches (e.g., hardware latches 220, 224, and 228 may be controlled together or independently.

Figure 2B:
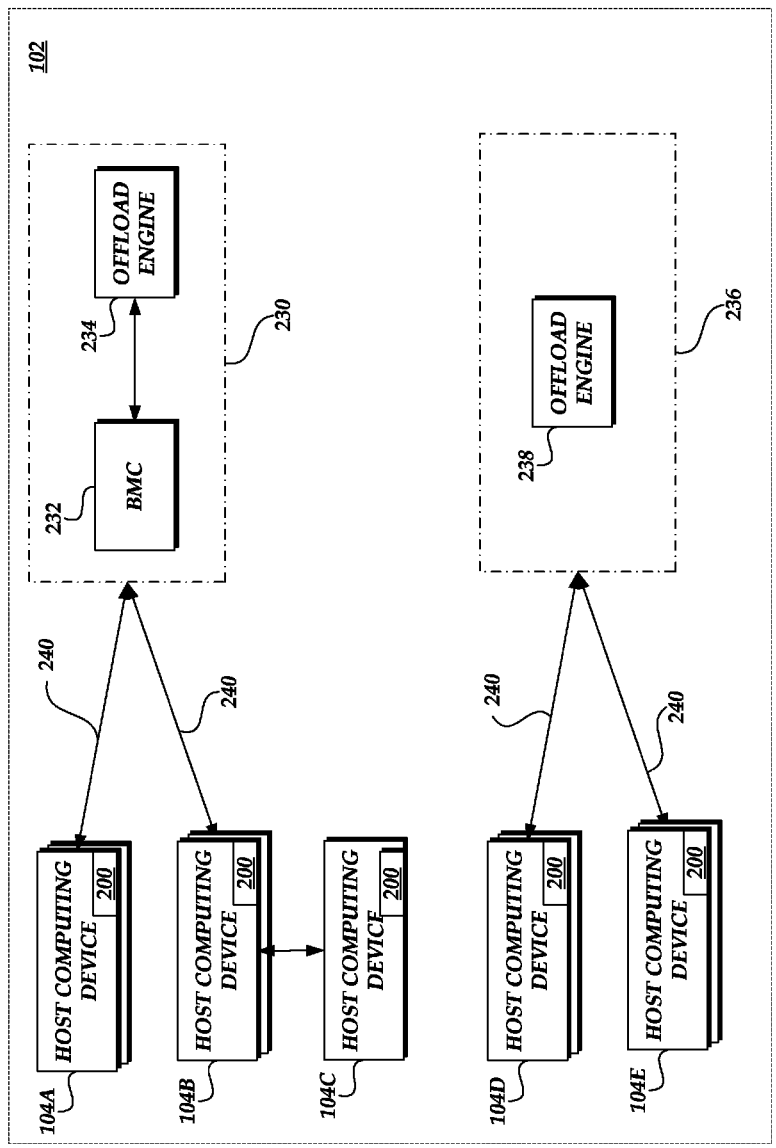

Turning now to FIG. 2B, in an illustrative embodiment, one or more components of a bare metal hosting platform may be shared among host computing devices 104. Illustratively, each host computing device 104 can include one or more components of a bare metal hosting platform, as illustrated at 200. However, in one example, a set of host computing devices 104A and 104B are in communication with an external component 230 that includes a BMC component 232 and offload engine component 234. In this example, the BMC component 232 and offload engine component 234 would perform at least a subset of the functions previously described with regard to the bare metal host platform 200 (FIG. 2A). As illustrated in FIG. 2B, a set of host computing devices 104C may not utilize the BMC component 232 and offload engine component 234 of the external component 230 even if the set of host computing devices 104C is in communication with the set of host computing devices 104B. Illustratively, the BMC component 232 and offload engine component 234 may be implemented in a manner such that individual host computing devices (e.g., 104A) do not need a corresponding local BMC component or offload engine component. Alternatively, the BMC component 232 and offload engine component 234 may be redundant to any local BMC component or offload engine component or work in conjunction with a local BMC component or offload engine component.

By way of another illustrative example, a set of host computing devices 104D and 104E are in communication with an external component 236 that includes only an offload engine component 238. In this example, the offload engine component 238 would have to be in communication with a BMC component that would be local to the host computing devices 104D and 104E or otherwise shared by the host computing devices 104D and 104E. Illustratively, the external components 230 and 236 may establish communication with the set of host computing devices 104 via a variety of communication media 240 implementing one or more communication protocols. Additionally, the external components 230 236 may also implement or incorporate additional or alternative security methodologies, architectures or protocols with regard to communications with the host computing devices 104.

The external components 230, 236 illustrated in FIG. 2B are illustrated logically in nature and may be actually implemented remotely from the host computing devices 104 or implemented in a distributed manner such that there would be multiple instances of the external components. Additionally, while the external components 230, 236 illustrated in FIG. 2B correspond to a shared BMC component and offload engine component, additional components may be also be shared by one or more host computing devices 104 as previously discussed.

Figure 2C:
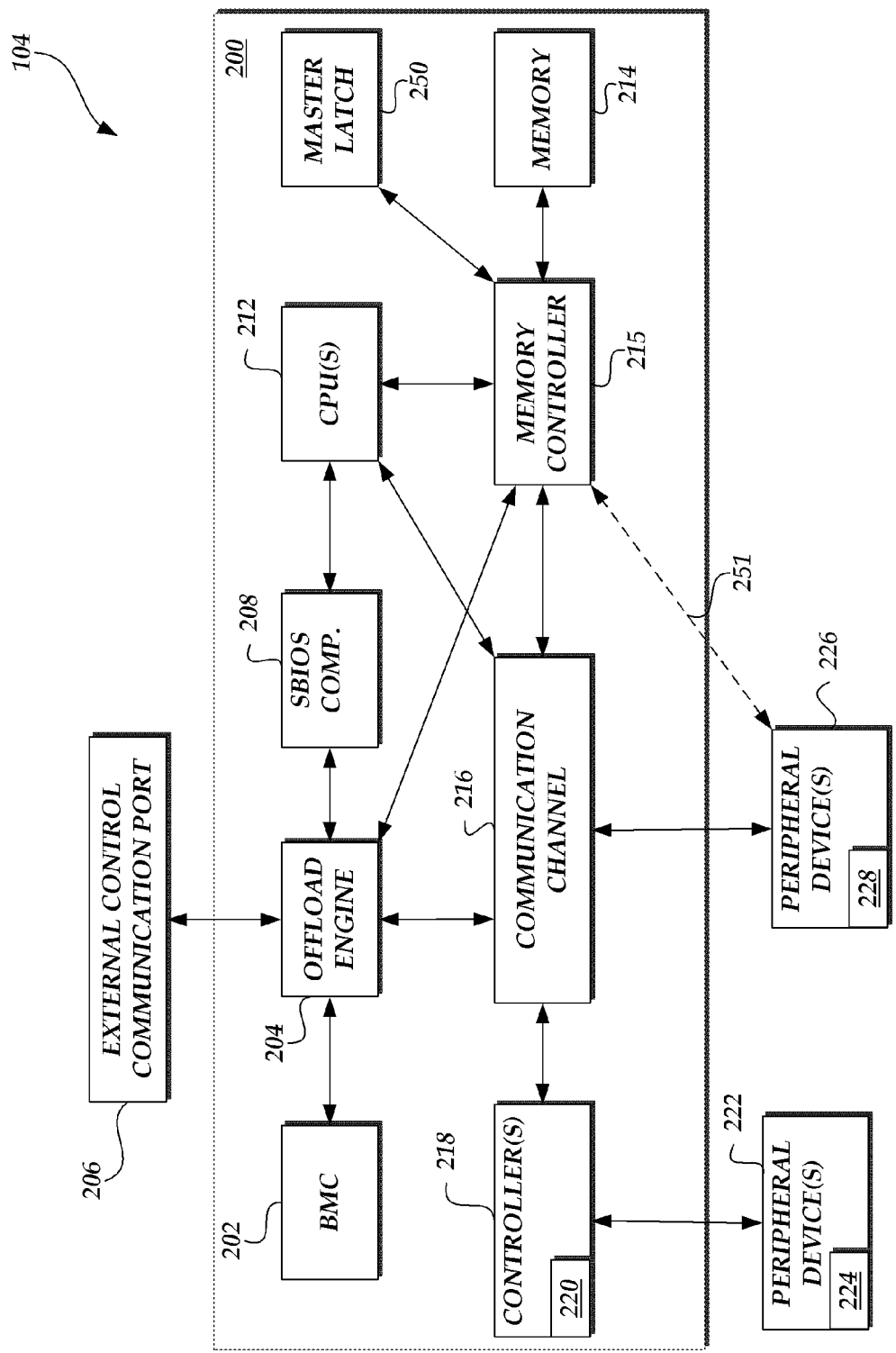

Turning now to FIG. 2C, a block diagram depicting illustrative components associated with a host computing device 104 implementing a bare metal platform 200. Illustratively, in this embodiment, the bare metal hosting platform 200 may include a master latch component 250. The master latch component 250 may be used to determine when the manipulation of one or more latches, such as latches 210, 220, 224, 228, may be permitted or should be implemented. In some embodiments, the master latch component 250 may be memory with a defined physical memory space on the motherboard of hosting platform 200. The master latch component 250 may communicate a master-latch state that indicates when latches may be manipulated. For example, the master latch component 250 may store a first master-latch state value, such as 0x0000, indicating that the latches 220, 224, 228, may be manipulated to permit access to one or more aspects of the latchable devices or permit modifications to software code associated with the latchable devices. The master latch component 250 may also store a second master-latch state value, for example 0xFFFF, indicating that the latches 220, 224, 228 may be not manipulated to permit access to one or more aspects of the latchable devices or permit modifications to software code associated with the latchable devices, such as device firmware. In addition, the second master-latch state value may indicate that once the latches 220, 224, 228 have been closed to permit modifications to the software code that they should be opened to prevent further modifications.

The master-latch state stored on the master latch component 250 may be set, in some embodiments, by the offload engine component 204 of the bare metal hosting platform 200. In other embodiments, the master-latch state may be set from an external signal received through the external control communication port 206. The signal may originate from the network based services 106 described with respect to FIG. 1. In other embodiments, the bare metal hosting platform may have a hardware switch that controls whether the master latch component 250 should be set on a power cycle. The hardware switch may be manipulable by a human operator that maintains and controls the virtual network 102.

The master latch component 250, in some embodiments, may only perform one state transition cycle per power cycle.

For example, once the master-latch state stored in the master latch component 250 has been changed to indicate that latches 220, 224, 228 may not be manipulated, the master-latch state may not be changed to permit latch manipulation until the BMC 202 (or similar server management component) performs a power cycle. In one illustrative embodiment, upon a power cycle, the master latch component may store a master-latch state value of 0x0000. The master latch component 250, as part of its power cycle may be configured to transition its master-latch state value to 0xFFFF thereby indicating that latches 220, 224, 228 may be manipulated once the boot process is idled by the offload engine component 204 to permit modification to software code associated with latchable devices 218, 222, 226. Before the idled boot process is enabled, the master-latch state value may be changed to 0x0000 thereby indicating that latches 220, 224, 228 may no longer be manipulated. Once the master-latch state performs one state transition cycle (transitions from 0x0000 to 0xFFFF and then back to 0x0000), the mater latch component 250 may not be written to or set until the BMC 202 performs a power cycle. In another illustrative embodiment, the master latch component 250 may be write once and may only be cleared upon a power cycle. For example, a master-latch state value of 0x0000 may indicate latches 220, 224, 228 may be manipulated and a master-latch state value of 0xFFFF may indicate latches 220, 224, 228 may not be manipulated. Thus, once a byte is written to the master latch component 250, latches 220, 224, 228 may not be manipulated until the BMC performs another power cycle.

In some aspects, the latchable devices, or their respective controllers, may include software code containing logic capable of manipulating its latch. For example, peripheral device 226 may include software code containing logic capable of manipulating its latch 228 or controller 218 may include software code containing logic capable of manipulating the latch 224 of its associated peripheral device 222. The state of the master latch component 250 may be checked by the peripheral device 222 or controller 218 before the respective latches are manipulated. In some aspects, the offload engine component 204 may contain logic for manipulating the latches 220, 224, 228, and the offload engine component 204 may check the state of the master latch component 250 before manipulating latches 220, 224, 228.

Figure 2D:
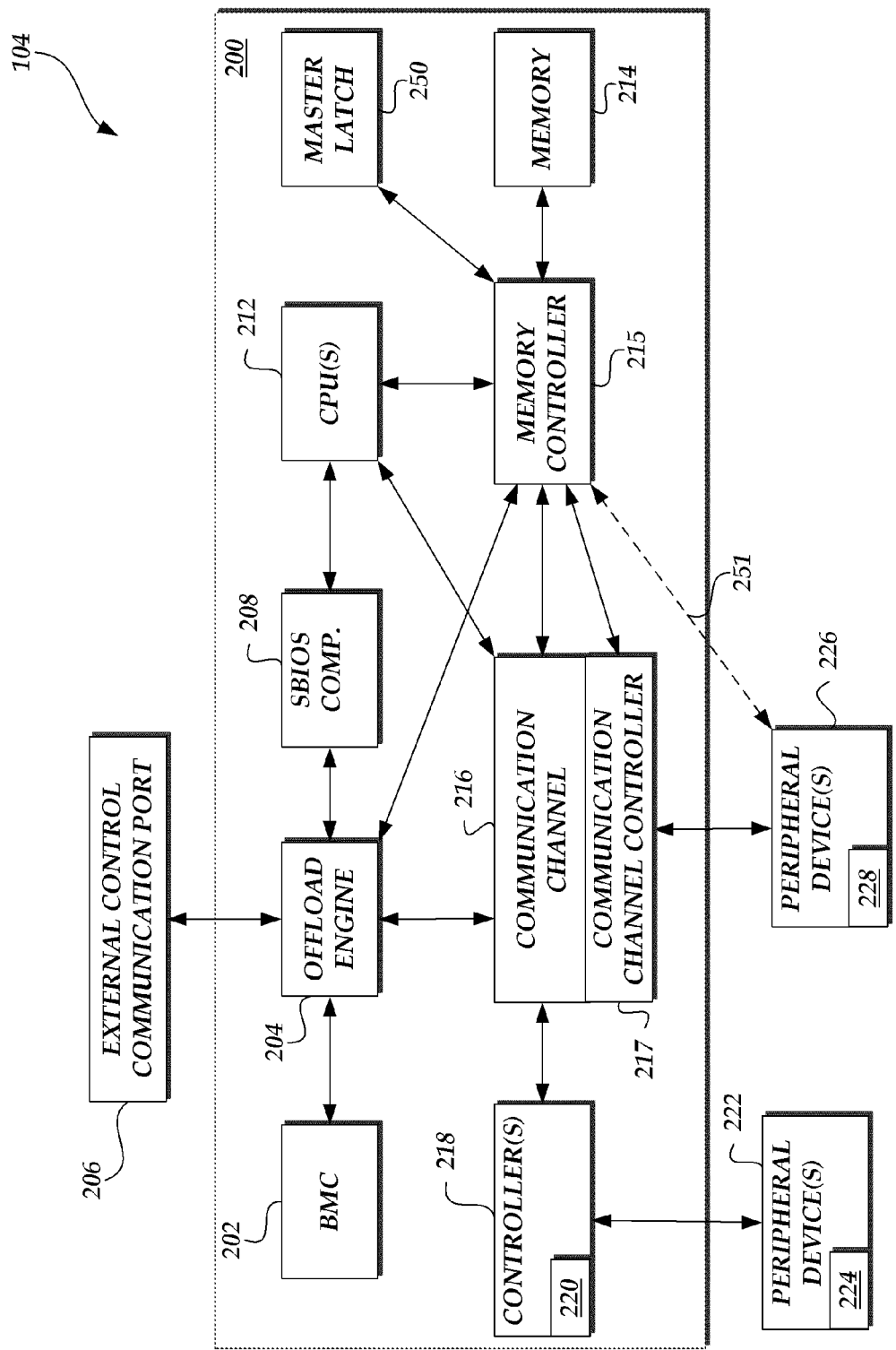

The latchable devices 218, 222, 226 may access the master latch component 250 through a memory controller 215. Although FIG. 2D illustrates the master latch 250 as a separate component from the memory controller 215, in some embodiments, the memory controller 215 or communication channel 216 may contain the master latch 250. In some embodiments, 215 and 216 may be integrated into a single communication controller. The memory controller 215 may be, for example, an input/output memory management unit ("IOMMU") that allows direct memory access ("DMA") to the mater latch component 250. In some embodiments, the defined physical address of the master latch component 250 may be not mapped by the IOMMU. Upon a boot cycle initiated by the BMC 202, the peripheral device 228 may access the master latch component via DMA by its defined physical memory address (as indicated by logical connection 251). As shown in the illustrative embodiment of FIG. 2C, the peripheral device 228 may access the memory controller 215 through the communication channel 216 and obtain the master-latch state stored in the master latch component 250, or the peripheral device 222 may access the memory controller 215 through its respective controller 218. In some embodiments, some latchable devices may access the memory controller 215 without the use of the communication channel 216.

In some embodiments, latchable devices may be chained and the master-latch state may be accessed through an intermediary device, for example instead of through direct access or DMA. In such embodiments, the latchable devices 218, 222, 226 may expose the master-latch state to any peripheral devices connected to it, or it may pass down or communicate the master-latch state to any peripheral devices connected to it. For example, a first peripheral device that utilizes the USB protocol may be connected to a second peripheral device utilizing the USB protocol that is connected to the communication channel 216. Although the first peripheral device is not directly connected to communication channel 216 and may not be able to access the master latch component 250 via DMA, it may access the master-latch state from the second peripheral device.

In some embodiments, the latches 220, 224, 228 of the latchable devices 218, 222, 226 may be in a "closed-latch" state, a "hard-latch" state or a "soft-latch" state. In the closed-latch state, access to one or more aspects of the device associated with the latch is permitted. For example, when latch 228 is in the "closed-latch" state, one or more aspects of the peripheral device 226 may be accessed and/or modified. In some embodiments, once a latch is in the closed-latch state, it may only transition to a hard-latch state. In the hard-latch state, the latch restricts or prevents access to one or more aspects of the device associated with the latch. For example, when latch 224 is in the hard-latch state, one or more aspects of the peripheral device 222 may not be accessed. Illustratively, once in the hard-latch state, a latch may not be set to allow access to one or more aspects of the device associated with the latch absent the occurrence of a latching initialization event, which will be described below.

In addition to the closed-latch state and the hard-latch state, some latches may also have a soft-latch state. The soft-latch state may be a temporary latch state causing the latch to restrict access to one or more aspects of device associated with the latch. The difference between the soft-latch state and the hard-latch state is that when a latch is in the soft-latch state, the latch may transition to the closed-latch state, but once a latch is in the hard-latch state a latch may not transition to the closed-latch state absent the occurrence of a latch initialization event.

In some embodiments, the hardware latches 220, 224, 228 may enter the soft-latch state upon an initialization event, and the device or offload engine component 204 may set the latch to the closed-latch state based on a polling of the master-latch state indicated by the master latch. When the master-latch state indicates that modifications are permitted, the latch may be set to the closed-latch state by the device or the offload engine component 204. When the master-latch state changes to indicate that modifications are no longer permitted, the latch may be set to the hard-latch state by the device or the offload engine component 204.

In an alternative embodiment, the master latch component 250 may be configured in a manner that that establishes a time window in which the master latch component will transmit master latch state information that would result in the transition of hardware latches, such as the hardware latches 220, 224, 228, to closed-latch state from an initialized soft-latch state. In accordance with one example, the master latch component 250 may be configured such that, upon initialization, the master latch state of the master latch component will be set to a closed latch state for a specified time. One or more latchable hardware devices polling the master latch state during this time would be allowed to transition from a soft-latch state to a closed-latch state based on the current master latch state. Upon expiration of the specified time (e.g., five seconds), the master latch state of the master latch component will automatically be set to a hard-latched state. Accordingly, the hardware latchable devices polling the master latch state after the expiration of the specified time could then transition to a hard-latched state responsive to the transition of the master latch state.

In still another alternative embodiment, the master latch component 250 may be associated with three latch states, namely, a closed latch state, an open latch state and a soft-latch state. In this embodiment, the master latch component 250 may be configured such that, upon initialization, the master latch state of the master latch component will initially be set to a closed latch state or soft-latched for a specified time. For instances in which the master latch state is indicative of a closed-latch state, one or more latchable hardware devices polling the master latch state during this time would be allowed to transition from a soft-latch state to a closed-latch state based on the current master latch state. Additionally, for instances in which the master latch state is indicative of a soft-latched state, one or more latchable hardware devices polling the master latch state would remain in a soft-latched state. Upon expiration of a first specified time (e.g., five seconds), the master latch state of the master latch component would then transition to one of a closed-latch state if modifications are appropriate or an open-latch state if modifications are not appropriate. Additionally, if the master latch component 250 would transition from a soft-latch state to a closed-latch state, a second specified amount of time could be utilized to specify how long the master latch component 250 would remain in a closed-latch state, as described above.

With regard to the two above embodiments, the hardware latches may also be configured with specified time delays in which to receive master latch state information from the master latch component 250. For example, one or more hardware latches, such as hardware latches 220, 224, 228, may be configured with a specified time delay in which to receive master latch state information from the master latch component and allow transition from an initial soft-latch state to closed-latch state. In some embodiments, the time period begins when the master latch enters the soft-latch state and in others the time delay may be based on the time since the latch has been powered. In some embodiments, once the specified time period has expired, the hardware latches may transition automatically to a hard-latch state regardless of whether the hardware latches have received an indication of a master latch state. In other embodiments, if the master latch component is capable of having a soft-latch state, the hardware latches may additionally refresh the specified time delay if the master latch component 250 remains in a soft-latch state. For example, one or more hardware latches may be configured with an initialize time delay of five seconds for receiving master latch state information. If the master latch state information is indicative of a soft-latch state, the hardware latch may reset the specified time for an additional five seconds in order to determine whether the master latch component transitions states. Still further, hardware latches may be configured with a maximum amount of delay or a maximum number of resets.

Turning now to FIG. 2D, a block diagram depicting illustrative components associated with a host computing device 104 with a master latch component 250 and communication channel controller 217 will be described. Illustratively, the hosting platform 200 of FIG. 2D includes a communication channel controller 217. The communication channel controller 217 may, in some embodiments, monitor the master latch component 250 for changes to the master-latch state. When a change to the master-latch state occurs, the communication channel controller 217 may send a signal to latchable devices, such as peripheral device 226 indicating the master-latch state. In some aspects, the signal may be a control signal specifically used to communicate the master-latch state. In some embodiments, the signal may be a signal already used by the peripheral device's communication protocol. For example, if the peripheral device is connected via USB, then the signal may the transmission of a data packet formatted according to the USB protocol.

Figure 3A:
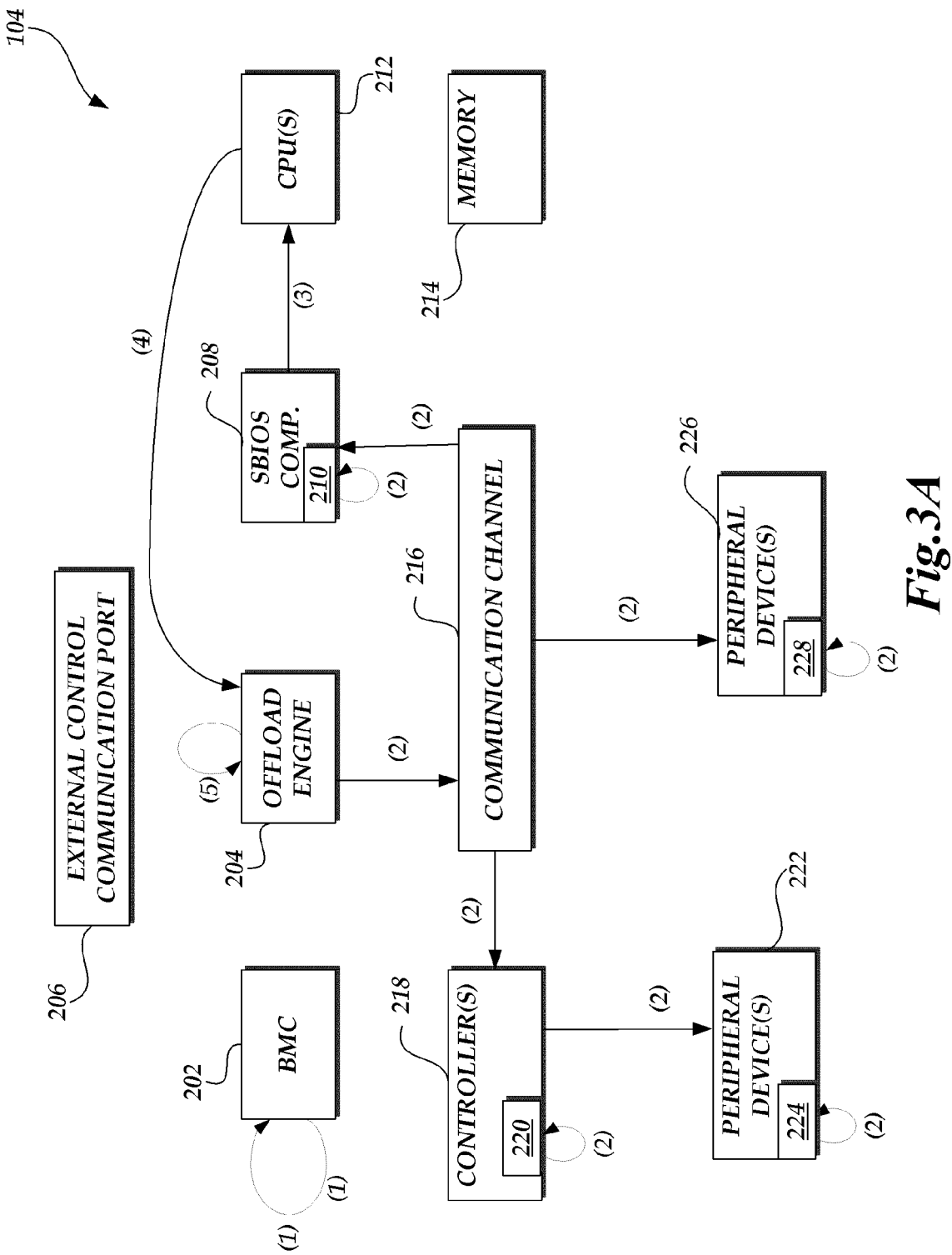
FIGS. 3A-3C are simplified block diagrams of the illustrative components of the host computing device of FIG. 2 illustrating the initiated of a boot process procedure.
Figure 3B:
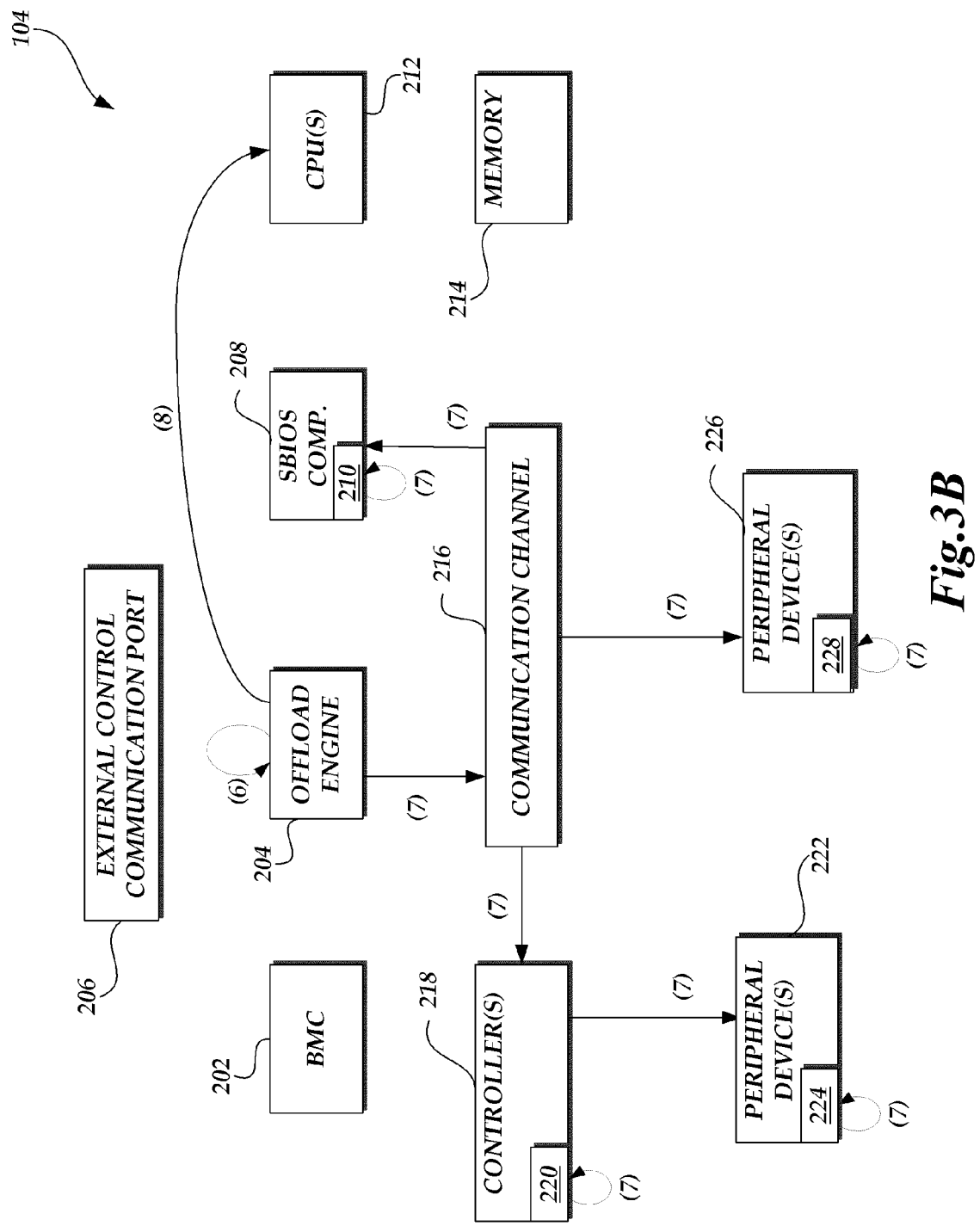
Figure 3C:
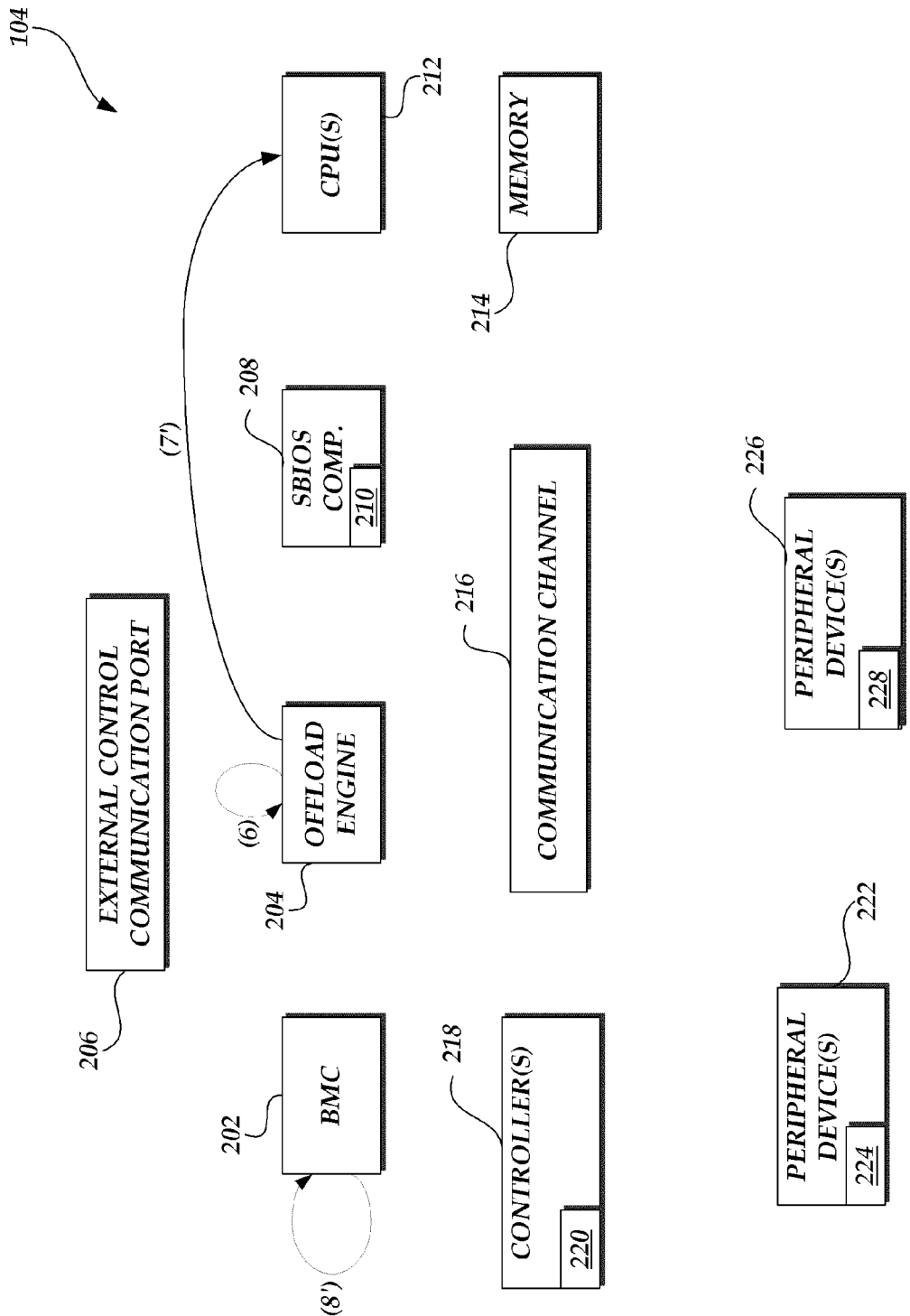

With reference now to FIGS. 3A-3C, simplified block diagrams of the bare metal hosting platform 200 of FIG. 2 will be utilized to illustrate a boot process implemented by a host computing device 104. With reference to FIG. 3A, at (1), the boot process begins by a power cycle initiated by the BMC 202. The power cycle may be part of the completion of the utilization of the host computing device 104 by a previous customer, the determination that host computing device 104 may need to be re-provisioned or re-configured, by the completion of an update process, and the like.

As part of the power cycle initiation (or upon completion of one or more identified processes), at (2), the offload engine component 204 (or other component) manipulates all the hardware latches such that modifications may be made to one or more components associated with the hardware latch. For example, the offload engine component 204 can transmit a signal such that a hardware latch, such as hardware latch 210, may be closed to allow the SBIOS component 208 to be placed in a state in which data can be written to the SBIOS component or that data previously maintained by the SBIOS component can be modified or replaced. As previously mentioned, the offload engine component 204 can select one or more hardware latches that will be manipulated independently of one another or control all the hardware latches together. Additionally, in one embodiment, the hardware latches can be sufficiently hardened or implemented in a way to mitigate the possibility that the latches could be manipulated by external components.

At (3), the CPU 212 communicates with the SBIOS component 208 to obtain executable code and attempts to implement a boot process, such as a PXE boot. At (4), the offload engine component is configured to present itself as a boot device, such as a NIC, such that the CPU 212 attempts to implement the boot process through the offload engine component 204. At (5), the offload engine component 204 delays the implementation of the requested boot process. For example, the offload engine component can include an option Read Only Memory ("ROM") process that results in a delay until the intended boot process is ready to be implemented. In another example, the offload engine component 204 can calculate or implement a timed delay process to allow sufficient time for one or more management functions to be implemented prior to proceeding with the boot request.

With reference to one illustrative in FIG. 3B, at (6), the offload engine component 204 initializes its embedded microprocessors and begins executing one or more management functions. Illustratively, in one embodiment, the offload engine component 204 can execute code that causes the offload engine component to implement one or more management functions. In another embodiment, the offload engine component 204 can initiate one or more services or communicate with other computing devices that implement executable code corresponding to one or more management functions. For example, offload engine component 204 can utilize one or more services 206 that are implemented in accordance with an Application Programming Interface ("API") based on authorization provided by the offload engine component. For purposes of describing illustrative management functions, however, the management functions will be described as implemented by the offload engine component 204.

In one aspect, the offload engine component 204 can execute code that relates to the establishment of a management control communication channel, such as via the external control communication port 206. In another aspect, the offload engine component 204 can modify or replace software or software configurations associated with one or more components in which a hardware latch permits modification. In a further aspect, the offload engine component 204 can implement various security or authentication schemas. In still another aspect, the offload engine component 204 can initiate a reconfiguration, cleanup, or examination of the computing device resources to ensure that such resources are available for use.

In addition to the management functions, the offload engine component 204 can also implement one or more processes for preparing the host computing device 104 for use with the customer specified request. In one aspect, the offload engine component 204 can enable one or more physical or emulated hardware components for utilization. For example, assume a host computing device 104 includes four processing units that are capable of being utilized, but a customer has only indicated they would utilize two processing units. The offload engine component 204 can then enable only two of the processing units responsive to the request. In another aspect, the offload engine component 204 can initiate one or more processes that will be run by the service provider during the time the host computing device 104 resources are being utilized by a customer. For example, the processes can include a health check module for determining the relative health/operation of the host computing device 104. In still a further aspect, the offload engine component 204 can then prepare for the target boot process to be initiated by the CPU 212.

With continued reference FIG. 3B, prior to allowing the host computing device 104 to begin executing code or communicating with untrusted or unsecured components, at (7) the offload engine component 204 (or other components) the offload engine component 204 can transmit a second signal that causes a manipulation of the hardware latches to prevent further modification to any associated components. For example, hardware latches may be set to an open position to prevent modification of firmware. At (8), the boot process is unblocked and the host computing device 104, through the CPU 212, begins the intended boot process, such as a bare metal boot process. At any point, the process illustrated in FIGS. 3A and 3B may be repeated based on a power cycle implemented by the BMC component 202 or upon termination/expiration of the use by the customer.

In an alternative to the process illustrated in FIG. 3B, in FIG. 3C, at (6') the offload engine 204 can determine that executable code corresponding to the boot process may be associated with a sufficient level of trust. In one embodiment, the offload engine component 204 unblocks the delayed boot process at (7'). As such, the host computing device 104, through the CPU 212, begins the intended, trusted boot process. During the intended, boot process, the executable code obtained during the boot process can be executed to implement one or more of the management functions illustrated with regard to FIG. 3B. In this embodiment, however, the offload engine component 204 can cause one or more of the hardware latches to remain closed after the boot process to facilitate the management function. Thereafter, the BMC component 202 can initiate a power cycle that will result in the repeat of the process illustrated in FIG. 3A. Additionally, in an alternative embodiment, prior to unblocking the delayed boot process, the offload engine component 204 can implement at least a portion of the pre-boot management interaction and processes discussed with regard to action (6) in FIG. 3B. In such an embodiment, the offload engine component 204 would proceed to unblock and implement the trusted boot code upon completion of some pre-boot management functions.

Figure 4A:
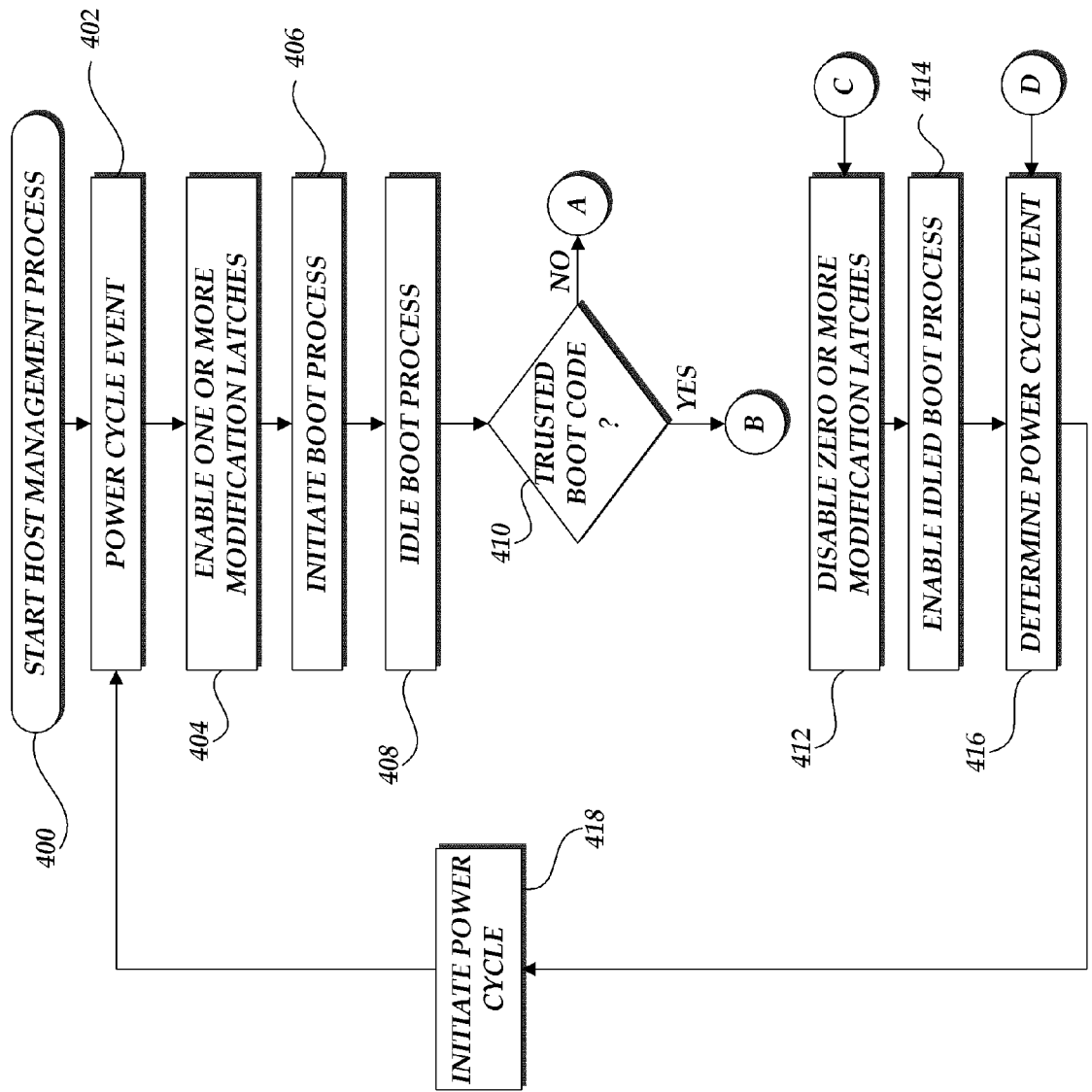
FIG. 4A is a flow diagram illustrating a host boot process routine implemented by a host computing device.

Turning now to FIG. 4A, a flow diagram illustrating a host boot process routine 400 implemented by a bare metal hosting platform 200 of a host computing device 104 will be described. In this regard, routine 400 will be described with regard to implementation by the bare metal hosting platform 200, which may include one or more components previously discussed with regard to the bare metal hosting platform. Such illustrations should not be construed as being limited to implementation by the illustrated components.

With reference to FIG. 4A, at block 402, the bare metal hosting platform 200 begins by determining a power cycle, such as a power cycle initiated by the BMC 202. The power cycle may be part of the completion of the utilization of the host computing device 104 by a previous customer, the determination that host computing device 104 may need to be re-provisioned or re-configured, by the completion of an update process, and the like. Still further, in other embodiments, the power cycle can be initiated by a customer request or service provider request, if the BMC 202 (through the offload engine component 204) facilitates such interfaces. For example, the BMC 202 may be able to initiate a power cycle based on an API exposed to a client computing device 110.

At block 404, the offload engine component 204 (or other component) manipulates all the hardware latches such that modifications may be made to one or more components associated with the hardware latch. For example, the offload engine component 204 can transmit a signal such that a hardware latch, such as hardware latch 210, may be closed to allow the SBIOS component 208 to be placed in a state in which data can be written to the SBIOS component. As previously mentioned, the offload engine component 204 can control select hardware latches independently of one another or control all the hardware latches together. Additionally, in one embodiment, the hardware latches can be sufficiently hardened or implemented in a way to mitigate the possibility that the latches could be manipulated by external components. For example, the hardware latches may be configured such that they are in an open position by default and can only be closed in limited circumstances.

At block 406, the CPU 212 begins execution of the code in the SBIOS component 208 and attempts to implement a boot process, such as a PXE boot. As previously described, in one embodiment, because the offload engine component 204 is configured to present itself as a boot device the CPU 212 attempts to implement the boot process through the offload engine component 204. By way of example, the offload engine component 204 can present itself as a NIC via the communication bridge 216. At block 408, the boot process initiated by a CPU 212 is idled or delayed to allow the offload engine component 204 to complete its management functions or other functions prior providing control or executing code associated with untrusted components. For example, the offload engine component 204 can include one or more processes that delay the boot process, such as an option ROM process or delay process.

At decision block 410, the offload engine component 204 determines whether the boot code that has been idled has been associated with a sufficient level of trust. If the boot code has not been associated with a sufficient level of trust, the routine 400 proceed to block 430 (FIG. 4B) in which one more pre-boot management processes will be implemented. If the boot code has been associated with a sufficient level of trust, the routine 400 proceeds to block 450 (FIG. 4C) in which one or more pre-boot management processes and one or more post-boot management processes may be implemented. Accordingly, the processing of management functions in routine 400 is illustratively dependent on a level of trust associated with the boot code to be implemented by the host computing device 104.

Figures 4B, 4C:
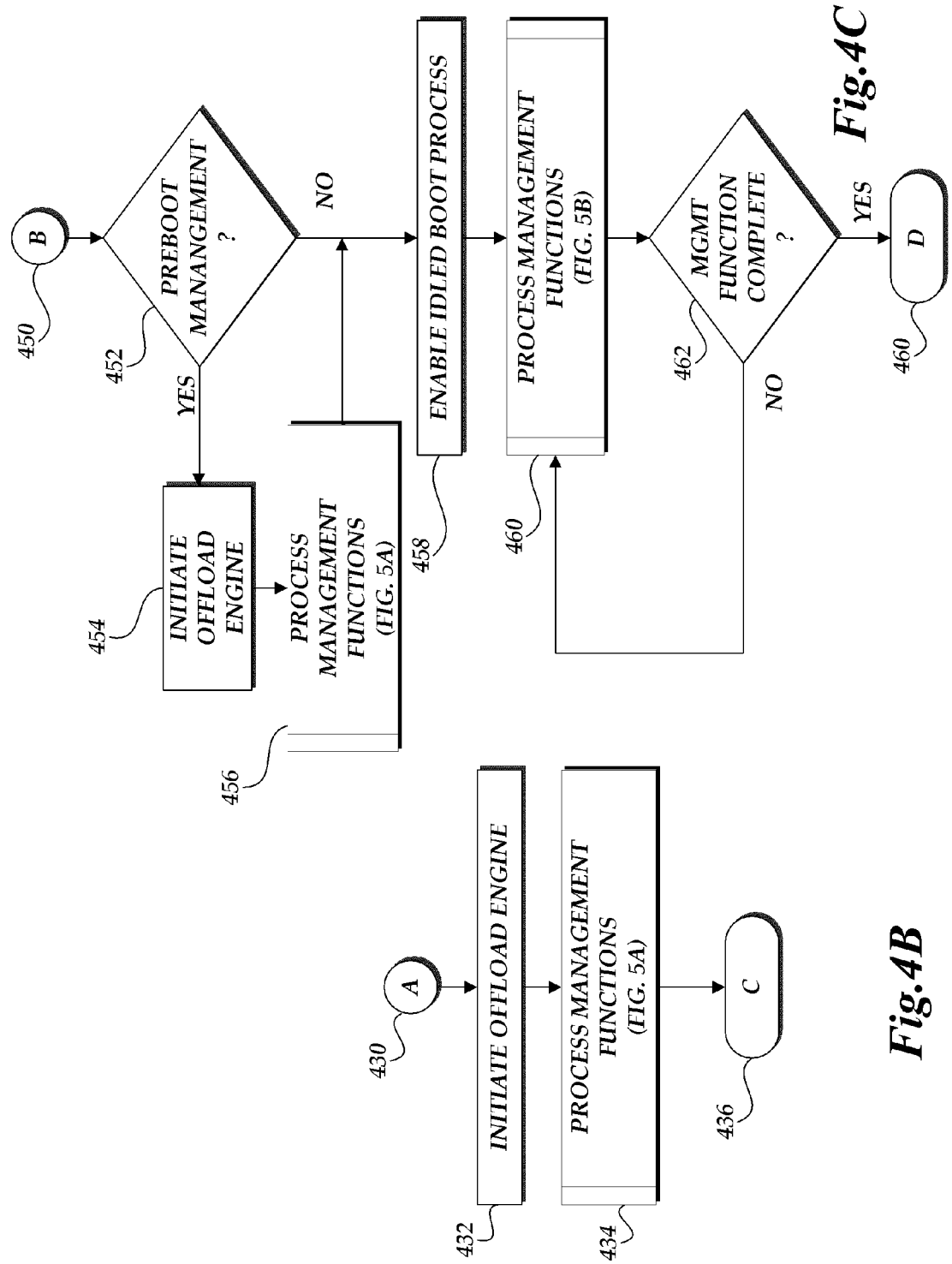
FIGS. 4B and 4C are flow diagrams illustrating embodiments for a host management subroutine implemented by a host computing device.

With continued reference to FIG. 4A, the routine 400 implements block 412 upon completion of a pre-boot management process, such as the pre-boot management process illustrated in FIG. 4B. Specifically, prior to allowing the host computing device 104 to begin executing code or communicating with untrusted or unsecured components, the offload engine component 204 (or other components) causes the manipulation of zero or more hardware latches to prevent further modification to any of their associated components. For example, hardware latches may be set to an "open" position to prevent modification of firmware. In this embodiment, as will be explained in greater detail below, the offload engine component 204 assumes that the boot process is untrusted. Accordingly, at block 414, the idled boot process is enabled and the host computing device 104 begins the intended boot process, such as a bare metal boot process.

Upon enablement of untrusted boot code at block 414, the host computing device 104 implements the untrusted boot code and executes any additional code provided by a customer until a determination of a power cycle event. Additionally, in embodiments in which the idled boot code is associated with a sufficient trust level, routine 400 implements block 416 upon completion of a potential combination of pre-boot and post-boot management functions as illustrated in FIG. 4C. In either embodiment, the routine 400 does not continue until there is a determination of a power cycle event at block 416. For example, a power cycle event may be determined based on expiration of a time period allotted for customer utilization of the host computing device 104. In another example, a power cycle event may be based on determination of an error or fault condition. In a further example, a power cycle event may be determined based on communications, such as a power cycle initiated by a system administrator or requested by the customer. The routine then proceeds to block 418, in which the BMC component 202 (or similar component which controls power to the host) initiates a power cycle. Accordingly, the routine 400 would then return to block 402 for processing of the power cycle event.

Turning now to FIG. 4B, a sub-routine for implementing a pre-boot host management subroutine 430 will be described. In one embodiment, the offload engine component 204 executes code or causes code to be executed that will implement one or more management functions. Accordingly, sub-routine 430 begins with the initiation of the offload engine component at block 432, which can include the initialization of one or more embedded microprocessors, obtaining of executable code, communication with network services, and the like. At block 434, the offload engine component processes management functions. The implementation of management functions will be described below with regard to FIG. 5A. At block 436, once the management functions have been implemented, the subroutine 436 returns to block 412 (FIG. 4A). In this embodiment, it is assumed that the executable code associated with the boot process is not associated a sufficient trust level and that the hardware latches will be manipulated (e.g., opened) upon completion of the processing of the management function and prior to the enablement of the boot process.

Turning now to FIG. 4C, a sub-routine for implementing an alternative host management subroutine 450 will be described. Specifically, in this embodiment, the host computing device 104 may implement one or more pre-boot management processes and one or more post-boot management processes. In some embodiments, the offload engine component 204 does not necessarily have to execute any of the code that will implement one or more management functions. Rather, if the boot process is associated with a sufficient trust level, the boot process may be enabled such that one or more of the hardware latches will remain closed. In other embodiments, one or more pre-boot management processes may be implemented by the offload engine component 204 prior to initiating the idled, trusted boot process.

Accordingly, subroutine 450 begins at decision block 452 with a determination of whether the host computing device 104 will implement any pre-boot management processes. If so, at block 454, the offload engine component 204 is initiated, which can include the initialization of one or more embedded microprocessors, obtaining of executable code, communication with network services, and the like. At block 456, the offload engine component 204 processes one or more pre-boot management functions. The implementation of management functions will be described below with regard to FIG. 5A.

Once the host computing device 104 has implemented any pre-boot management processes at block 456 or if at decision block 452, the host computing device 104 does not implement any pre-boot management processes, at block 458 the offload engine component 204, alone or in conjunction with other components, enables the idled boot process that has been associated with a minimal trust level. At block 460, the host computing device 104 processes management functions based on the execution of the code associated with the trusted boot process. The implementation of management functions will be described below with regard to FIG. 5B. Illustratively, the post-management process may be independent of any pre-boot management process implemented at block 456. Alternatively, one or more post-boot management processes may be implemented based on the implementation or outcome of one or more pre-boot management processes at block 456.

At block 462, a test is conducted to determine whether the management function implementation is complete. If not, the subroutine returns to block 460. Once the management functions have been implemented, at block 460, the sub-routine terminates and returns to block 416 for determination a power cycle (FIG. 4A). As previously described, in this embodiment, it is assumed that the executable code associated with the boot process is associated with a sufficient trust level and that the hardware latches will remain manipulated (e.g., closed) upon enablement of the boot process. As such, the host computing device 104 can reset the hardware latches by initiating a power cycle upon completion of the management function. Accordingly, the power cycle would result in a reset such that routine 400 would begin anew at block 402.

Turning now to FIG. 5A, a flow diagram illustrating a host boot process manage function subroutine 500 implemented by a bare metal hosting platform 200 of a host computing device 104 will be described. In this regard, subroutine 500 will be described with regard to implementation by the bare metal hosting platform 200 or the offload engine component 204, which may include one or more components previously discussed with regard to the bare metal hosting platform 200. Such illustrations should not be construed as being limited to implementation by the illustrated components. As previously described, aspects of subroutine 500 may be implemented at block 434 (FIG. 4B), which illustratively occurs prior to the disabling of the hardware latches (block 412). Additionally, aspects of subroutine 500 may be implemented at block 456 (FIG. 4C), which illustratively occurs prior to the enablement of a trusted, idled boot code. In such embodiments, the components executing the subroutine 500 may vary. Additionally, one or more specific blocks of subroutine 500 may be considered to optional and may be omitted as appropriate or selected.

At block 502, the offload engine component 204 initializes one or more software applications that will be utilized provide the management functions. For example, the offload engine component 204 can generate an update application that identifies a trusted source for update information and authenticates itself for obtaining the necessary update information. In another example, the offload engine component 204 can generate basic security functions that will be utilized to protect the operation of the bare metal hosting platform 200. Additional or alternative functions may be also be implemented.

At block 504, the offload engine component 204 component 204 can execute code that relates to the establishment of management control communication channel, such as via the external control communication port 206. As previously described, the bare metal hosting platform 200 can utilize a network connection to obtain control plane instructions for one or more components of the bare metal hosting platform 200. Additionally, the bare metal hosting platform 200 can establish and maintain multiple open communication channels based on anticipated need.

At block 506, the offload engine component 204 can modify or replace software or software configurations associated with one or more components in which a hardware latch permits modification. Illustratively, the offload engine component 204 can access memory for obtaining updates, software applications, etc. At block 508, the offload engine component 204 can initiate a reconfiguration, cleanup, or examination of the computing device resources to ensure that such resources are available for use. In one aspect, the offload engine component 204 can initiate a cleanup of data previously stored on hard disks 224. In another aspect, the offload engine component 204 can execute code that relates to the establishment of management control communication channel, such as via the external control communication port 206. In another aspect, the offload engine component 204 can modify or replace software associated with one or more components in which a hardware latch permits modification. In a further aspect, the offload engine component 204 can implement various security or authentication schemas. In still another aspect, the offload engine component 204 can initiate a reconfiguration, cleanup, or examination of the computing device resources to ensure that such resources are available for use.

At block 508, the offload engine component 204 can also implement one or more processes for preparing the host computing device 104 for use with the customer specified request. In one aspect, the offload engine component 204 can enable one or more physical or emulated hardware components for utilization. For example, assume a host computing device 104 includes four processing units that are capable of being utilized, but a customer has only indicated they would utilize two processing units. The offload engine component 204 can then enable only two of the processing units responsive to the request.

At block 510, the offload engine component 204 can initiate one or more processes that will be run by the service provider during the time the host computing device 104 resources are being utilized by a customer. For example, the processes can include a health check module for determining the relative health/operation of the host computing device 104. In still a further aspect, the offload engine component 204 can then prepare for the real boot process requested by the CPU 212. At block 512, the offload engine component 204 can obtain any additional boot code required for enabling a boot process. At block 514, subroutine 500 terminates.

Turning now to FIG. 5B, a flow diagram illustrating a host boot process manage function subroutine 550 implemented by a host computing device 104 will be described. In this regard, subroutine 550 will be described with regard to implementation by the host computing device 104, which may include one or more components previously discussed with regard to the bare metal hosting platform 200. Such illustrations should not be construed as being limited to implementation by the illustrated components. As previously described, aspects of subroutine 550 may be implemented at block 460 (FIG. 4C), which illustratively occurs after the initiation of an idled boot process (block 458) and the optional processing of pre-boot management functions (block 456). Still further, subroutine 500 may be illustratively implemented prior to the disabling of the zero or more hardware latches (block 412 of FIG. 4A). One or more specific blocks of subroutine 500 may be considered to optional and may be omitted as appropriate or selected.

At block 552, the host computing device 104 initializes one or more software applications that will be utilized provide the management functions. For example, the host computing device 104 can generate an update application that identifies a trusted source for update information and authenticates itself for obtaining the necessary update information. In another example, the host computing device 104 can generate basic security functions that will be utilized to protect the operation of the bare metal hosting platform 200. Additional or alternative functions may be also be implemented.

At block 554, the offload engine component 204 component 204 can execute code that relates to the establishment of management control communication channel, such as via the external control communication port 206. As previously described, the bare metal hosting platform 200 can utilize a TOR connection to obtain control plane instructions for one or more components of the bare metal hosting platform 200. Additionally, the bare metal hosting platform 200 can establish and maintain multiple open communication channels based on anticipated need.

At block 556, the host computing device 104, directly or through one of the components (e.g., the offload engine component 204) can modify or replace software or software configurations associated with one or more components in which a hardware latch permits modification. Illustratively, the host computing device 104 can access memory for obtaining updates, software applications, etc.

At block 558, the offload engine component 204 can initiate a reconfiguration, cleanup, or examination of the computing device resources to ensure that such resources are available for use. In one aspect, the host computing device 104 can initiate a cleanup of data previously stored on hard disks 224. In another aspect, the host computing device 104 can modify or replace software associated with one or more components in which a hardware latch permits modification. In a further aspect, the host computing device 104 can implement various security or authentication schemas. In still another aspect, the offload engine component 204 can initiate a reconfiguration, cleanup, or examination of the computing device resources to ensure that such resources are available for use.

At block 558, the offload engine component 204 can also implement one or more processes for preparing the host computing device 104 for use with the customer specified request. In one aspect, the offload engine component 204 can enable one or more physical or emulated hardware components for utilization. For example, assume a host computing device 104 includes four processing units that are capable of being utilized, but a customer has only indicated they would utilize two processing units. The offload engine component 204 can then enable only two of the processing units responsive to the request.

At block 560, the offload engine component 204 can initiate one or more processes that will be run by the service provider during the time the host computing device 104 resources are being utilized by a customer. For example, the processes can include a health check module for determining the relative health/operation of the host computing device 104. In still a further aspect, the offload engine component 204 can then prepare for the real boot process requested by the CPU 212. At block 562, subroutine 500 terminates.

Figure 6A:
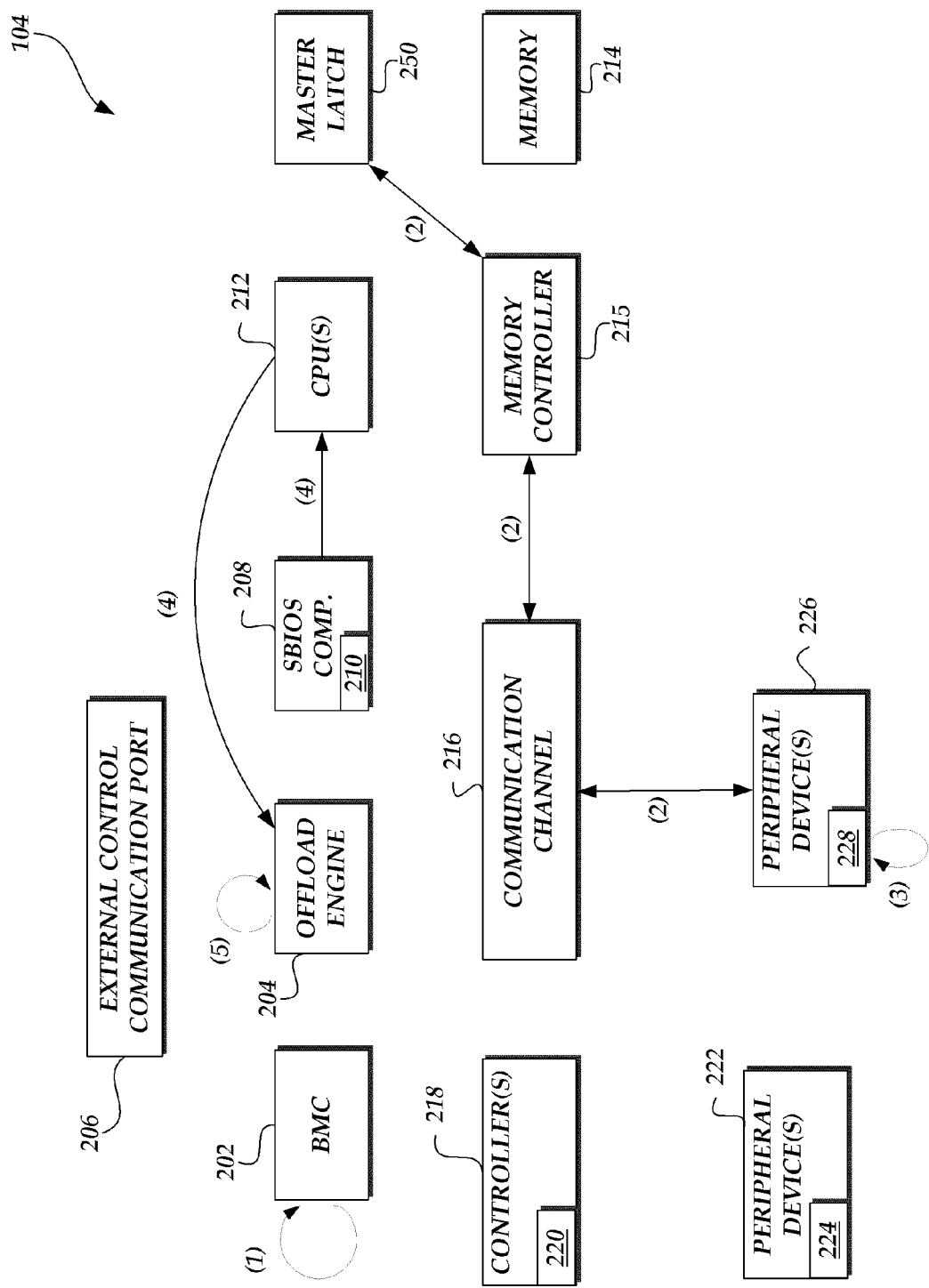
FIGS. 6A-6B are simplified block diagrams of the illustrative components of the host computing device of FIG. 2 illustrating a boot process procedure utilizing a master latch.
Figure 6B:
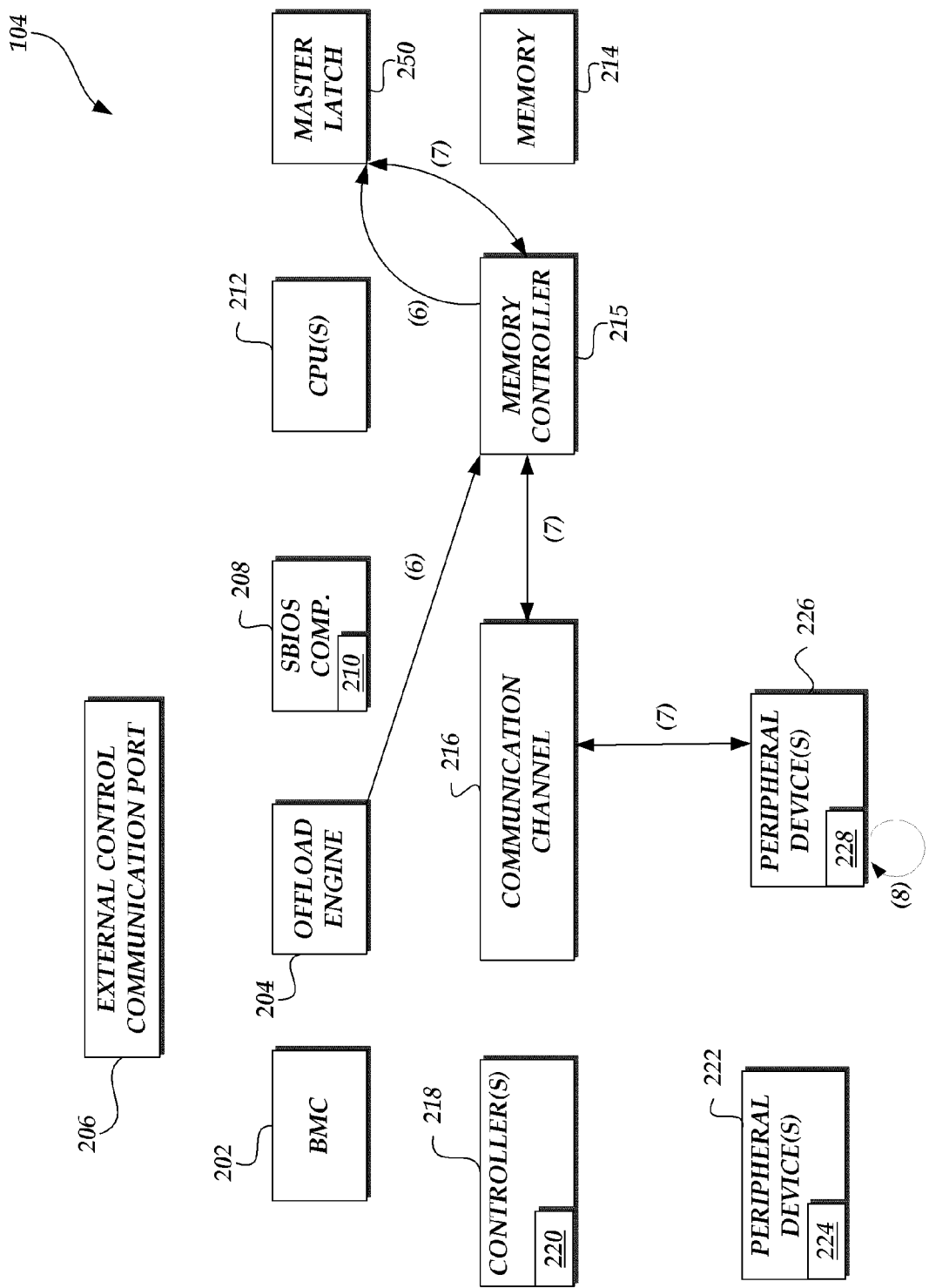

With reference now to FIGS. 6A-6C, simplified block diagrams of the bare metal hosting platform 200 of FIG. 2 will be utilized to illustrate a boot process utilizing a master latch component 250 implemented by a host computing device 104. FIGS. 6A-6B illustrate a boot process utilizing a master latch component 250 where the master latch component 250 is polled by latchable devices. As described above, in some embodiments, the bare metal hosting platform 200 may include a communication channel controller 217 that notifies latchable devices of the master-latch state. One skilled in the art will appreciate that although FIGS. 6A-6B do not show a bare metal platform 200 with a communication channel controller 217, embodiments with a communication channel controller may function in the same, or substantially the same, manner as described with reference to FIGS. 6A-6B.

With reference to FIG. 6A, at (1), the boot process illustratively begins by an initialization of latches of the master latch component 250, such as a power cycle event initiated by the BMC 202. For example, a power cycle event may be part of the completion of the utilization of the host computing device 104 by a previous customer, the determination that host computing device 104 may need to be re-provisioned or re-configured, by the completion of an update process, and the like. As part of the latch state initialization event, the latch 228 of peripheral device 226 may initialize in a soft-latch state, that is, at (1), the latches 210, 220, 224, 228 may be in the soft-latch state. As previously discussed, the mechanism as to how the latches are initialized or transition to different states may vary according to the physical implementation of the specific hardware latch.

As part of the latch state initialization event (or upon completion of one or more identified processes), at (2), the latchable devices (for example, the peripheral device 226) may also poll the master latch component 250 for its master-latch state. The polling may occur responsive to set criteria (e.g., a power event) and reoccur on a periodic basis. Periodic polling of the master latch component 250 for the master-latch state advantageously provides secure latch control for those latchable devices that have been "hot-swapped" into the host computing device 104 before a power cycle. As the latchable devices poll the master latch component 250, master-latch state information or data may be communicated to the latchable devices through the communication channel 216 or memory controller 215. Once the mater latch-state indicates that one or more aspects of the latchable devices may be accessed or modified, the latchable devices, at (3), may close their respective hardware latches or cause the hardware latches to be set to a close state.

At (4), the CPU 212 communicates with the SBIOS component 208 to obtain executable code and attempts to implement a boot process, such as a PXE boot. The offload engine component 204 may be configured to present itself as a boot device, such as a NIC, such that the CPU 212 attempts to implement the boot process through the offload engine component 204. At (5), the offload engine component 204 delays the implementation of the requested boot process. For example, the offload engine component can include an option Read Only Memory ("ROM") process that results in a delay until the intended boot process is ready to be implemented. In another example, the offload engine component 204 can calculate or implement a timed delay process to allow sufficient time for one or more management functions to be implemented prior to proceeding with the boot request.

Continuing with reference to FIG. 6B, at (6) once the boot request proceeds, the offload engine component 204, or some other component, may set the master latch component 250 to indicate that no further modifications or accesses to one or more aspects of the latchable devices may occur until the next power cycle. At (7), as the latchable devices are continuously polling the mater latch 250, they receive the updated master-latch state indicating that modifications to latchable devices are no longer permitted as the boot request is no longer idle. In response to receiving the updated master-latch state, at (8), the latches transition to the hard-latch state. Illustratively, once a hardware latch has transitioned to a hard latched state, the hardware latch may be restricted in the ability to transition to a soft-latch state or the closed-latched state until the occurrence of a subsequent latch state initialization event.

Figure 7:
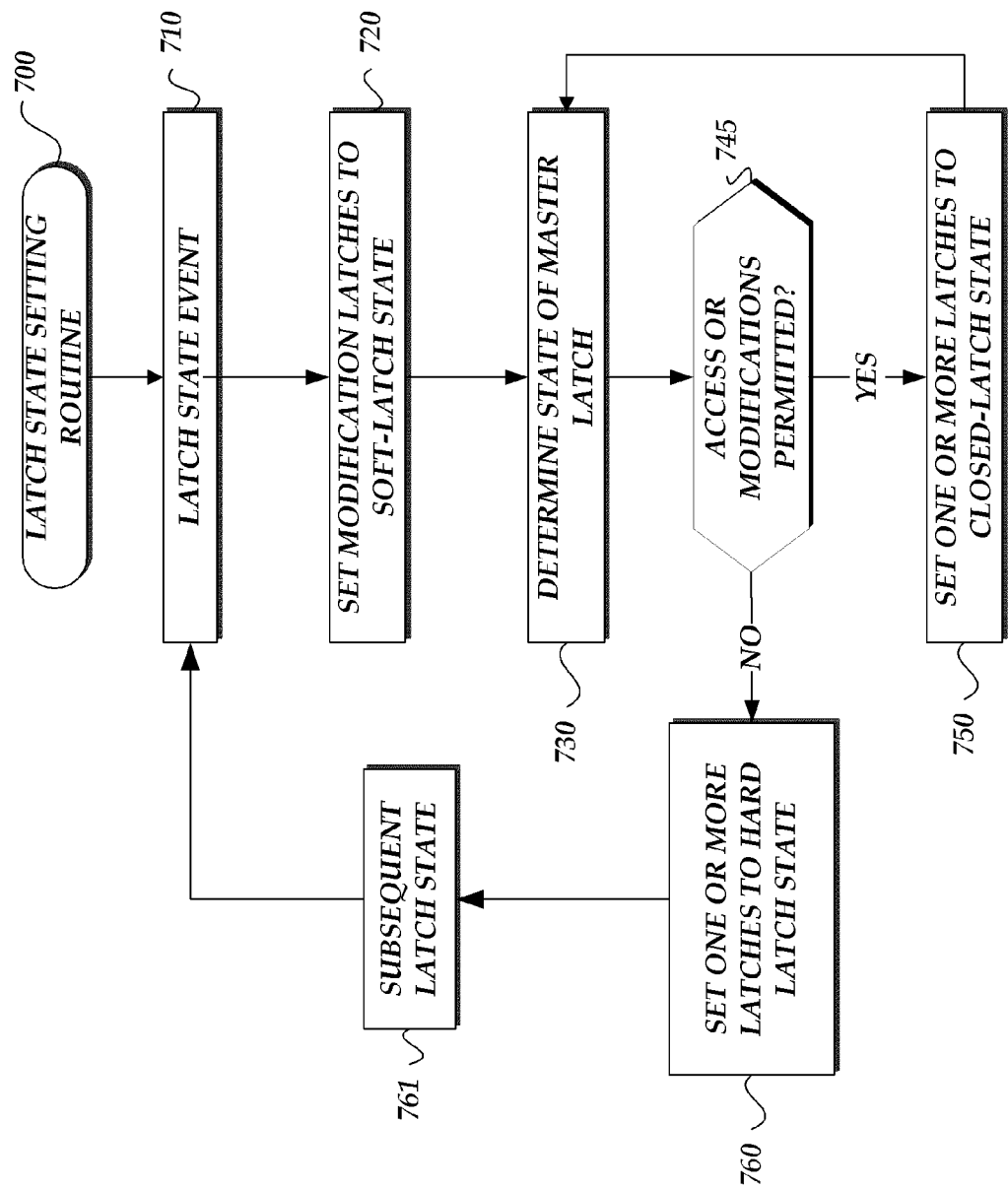
FIG. 7 is a flow diagram illustrative of embodiments of a latch setting routine implemented by a computing device.

With reference now to FIG. 7, a flow diagram illustrative of embodiments of a latch setting routine 700 implemented by a computing device will be described. The latch setting routine 700 may be implemented, in some embodiments by the latchable devices, such as SBIOS component 208 or peripheral devices 222, 226. The latch setting routine may also be implemented by computing device or component that controls the latches of latchable devices, such as controller 218 or offload engine component 204.

At block 710, a latch state initialization event is detected. In one embodiment, the latch state event may correspond to a power cycle event initiated by the BMC 202 component that results in the setting of a latch state in the master latch component 250. In another embodiment, the latch state initialization event can correspond to the modification of one or more power sources associated with a component (e.g., connecting a power source), connection of one or more devices, or manipulation of controls (e.g., switches, resets, etc.). The latch state initialization event may "reset" the hardware latches 210, 220, 224, 225 to the soft-latch state as indicated in block 720. The master-latch state provided by the master latch may be determined as indicated in block 730. The master-latch state may be determined, in some embodiments, through periodic polling of the mater latch component 250. In other embodiments, the master-latch state may be determined by accessing or receiving a signal indicating the mater-latch state. The master-latch state signal may come from a controller component such as communication channel controller 217. At block 745, if the master-latch state indicates that one or more aspects of the latchable devices may be accessed or modified, the one or more latches associated with the latchable devices may be set to the closed-latch state. Once in the closed-latch state, the master-latch state may be determined at block 730. If access or modifications to one or more aspects of the latchable devices are not permitted, processing moves to block 760 where the one or more latches are set to the hard-latch state. Once in the hard-latch state, the hardware latches may not be set to another state until a subsequent latch state initialization event is initiated at block 761. Illustratively, the subsequent latch state initialization event may not necessarily be required to the same latch state initialization event that triggered the previous processing of latch state information.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A hardware device comprising:
   one or more computing components;
   one or more hardware latches configured to prevent modifications to code or data utilized with the one or more computing components based on individual states of the one or more hardware latches;
   a master latch component configured to control manipulation of the one or more hardware latches based, at least in part, on a master latch state; and a controller configured to detect the master latch state of the master latch component and manipulate the one or more hardware latches based, at least in part, on the master latch state.

2. The hardware device of claim 1, wherein after the one or more hardware latches are manipulated to prevent modifications to the code or data, the controller cannot manipulate one or more hardware latches to permit modifications to the code or data until the hardware device performs a power cycle.

3. The hardware device of claim 1, wherein the controller is further configured to periodically access the master latch state.

4. The hardware device of claim 1, wherein the one or more hardware latches are initially configured to prevent modifications to the code or data.

5. The hardware device of claim 1 further comprising an offload engine component configured to establish a management control communication channel between the hardware device and an external management service.

6. The hardware device of claim 5, wherein the master latch state is set by the external management service.

7. The hardware device of claim 5, wherein the external management service provides control plane instructions for configuring at least one attribute of individual computing components.

8. The hardware device of claim 1, wherein the master latch cannot be remapped by an input/output memory management unit.

9. The hardware device of claim 1, wherein the master latch state is accessed through an intermediary device.

10. The hardware device of claim 1, wherein after the master latch state has been changed to provide an indication that prevents manipulation of the one or more hardware latches, the master latch state is fixed in the same state until after a power cycle.

11. A computer-implemented method comprising:
as implemented by one or more computing devices configured with specific executable instructions,
   accessing a master latch for a first indication to determine whether to manipulate one or more hardware latches to permit modifications to code or data associated with the one or more computing components;
   manipulating the one or more hardware latches based at least in part on the first indication;
   executing a management function for at least one computing component associated with the manipulated one or more hardware latches;
   after executing the management function, accessing the master latch for a second indication to determine whether to manipulate one or more hardware latches to prevent modifications to the code or data associated with the one or more computing devices; and
   manipulating the one or more hardware latches based at least in part on the second indication.

12. The computer-implemented method of claim 11 further comprising changing a state of the master latch to prevent manipulation of the one or more hardware latches after the manipulating the one or more hardware latches based at least in part on the second indication.

13. The computer-implemented method of claim 11 further comprising establishing a management control communication channel between the hardware device and an external management service.

14. The computer-implemented method of claim 13 further comprising receiving control plane instructions from the external management service, and setting the master latch state based, at least in part, on the control plane instructions received from the external management service.

15. The computer-implemented method of claim 13 further comprising receiving control plane instructions from the external management service, and configuring at least one attribute of individual computing components based, at least in part, on the control plane instructions received from the external management service prior to manipulating the one or more hardware latches based at least in part on the second indication.

16. An apparatus comprising:
a host computing device comprising:
   one or more computing components;
   one or more hardware latches, configured to permit or prevent modifications to code or data utilized with the one or more computing components; and
   a master latch component configured to control manipulation of the one or more hardware latches based, at least in part, on a master latch state;
a baseboard management controller for initiating a power cycle of the host computing device; and
an offload engine component, implemented using an embedded microprocessor, wherein the offload engine component is configured to set the master latch state of the master latch to prevent or permit manipulation of the one or more hardware latches.

17. The apparatus of claim 16, wherein the offload engine component is further configured to establish a management control communication channel with an external management service.

18. The apparatus of claim 17, wherein the offload engine component is further configured to receive instructions to set the master latch state from the external management service.

19. The hosting platform of claim 17, wherein the offload engine component is further configured to receive instructions to instructions for configuring at least one attribute of individual computing components from the external management service.

* * * * *